June 29, 1937.                G. DEIBEL                2,085,297

DISCHARGING DEVICE FOR GASES AND VAPORS

Filed March 20, 1936

Inventor:
Gottfried Deibel.

Patented June 29, 1937

2,085,297

UNITED STATES PATENT OFFICE 2,085,297

DISCHARGING DEVICE FOR GASES AND VAPORS

Gottfried Deibel, Dresden, Germany

Application March 20, 1936, Serial No. 69,768
In Germany August 3, 1935

3 Claims. (Cl. 23—259)

This invention relates to a device for discharging and precipitating troublesome and noxious gases and vapors developing during digestion and vulcanization, the device being particularly intended for dentists, engravers, jewelers, or for similar small-scale work.

Discharging devices in the form of hoods and funnels for collecting and removing troublesome and noxious gases and vapors are known and much used in laboratories and workshops and are, as a rule, arranged above the working table at such height that a vessel can be placed under them for collecting the condensate. Apart from the fact that devices of this kind cannot be adapted without trouble to the requirements of small establishments of the class mentioned, they are furthermore open to the objection that a considerable portion of the collected vapors drips down as condensate on the walls of the funnel with the result that while part of it reaches the vessel underneath another part thereof is spilled and thus mixes with the air of the workroom. The known devices are, moreover, attacked by the acids after a short time.

The invention proposes to eliminate these defects by providing a bell or hood made of acid-proof, preferably ceramic, material like hard white ware, porcelain, glass, etc. and provided with a discharge pipe and a stand which is separated from the bell or hood by a centrally apertured bottom sloping towards the center. The stand accommodates a collecting vessel which is slidably disposed therein. In the central opening of the bottom between the hood and the stand a support having draining grooves and a grooved pin is detachably inserted and carries on its top plate a burner and a tripod for the boiling vessel. The condensate precipitating on the walls passes towards the inclined bottom and through the grooves of the pin into the sliding collecting vessel of the stand closed on all sides. The side wall of the hood is fitted with connections for the gas tube feeding the burner, and the front wall thereof has a clearance provided with a sliding glass door to permit observation of what is going on inside the hood.

Figure 1:
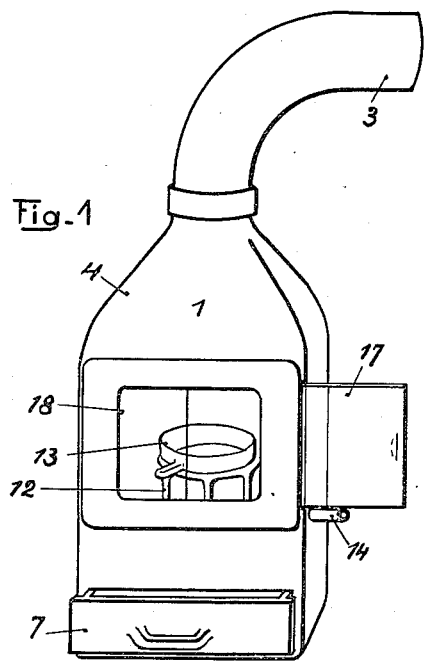
Figure 2:
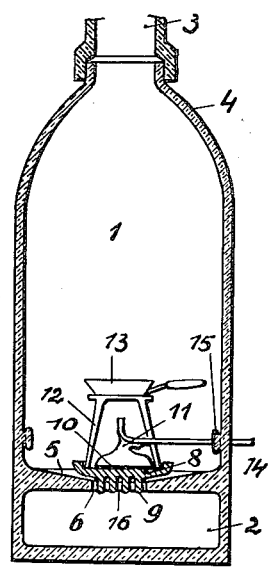
Figure 3:
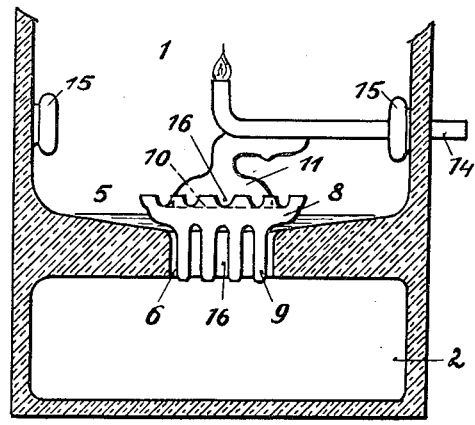

By way of example, the invention is illustrated in the accompanying drawing, in which Figure 1 is an elevation of the device; Fig. 2, a vertical section thereof; and Fig. 3, a detail view of Fig. 2 on an enlarged scale.

Referring to the drawing, 1 is the discharge hood made of acid-proof, preferably ceramic, material, such as hard white ware, porcelain, glass, etc., and provided with a stand 2. 3 is a pipe leading from the hood 1 to a chimney or the open air. Below the neck 4 the hood 1 is shaped so that the condensate settling on the inner walls thereof will slowly pass down on the walls and cannot drop directly from the neck 4 into a centrally arranged collecting vessel. The hood 1 and the stand 2 are separated from one another by an intermediate bottom 5 inclining towards the center where it possesses an opening 6. In the stand 2 a sliding vessel or box 7 serves for collecting the dripping condensate.

In the opening 6 a support 8 having a pin 9 is inserted so as to be easily removable. The plate 10 of the support 8 carries the burner 11 and above the latter on a tripod 12 the boiling vessel 13. A hose, not shown, is attached at the proper level to a packed connection 14 in the side wall of the hood 1 to supply gas to the burner 11. Sockets for the connection 14 are provided on each side of the hood 1, the socket not in use being stopped up. The bottom 5 is, as stated, slightly inclined, and the somewhat arched support 8 possesses in its arched top plate 10 grooves 16 for guiding acid that has boiled over towards the opening 6 and into the collecting vessel underneath to prevent the burner and tripod from standing in this acid, etc. A sliding door 17, preferably made of glass, in front of the clearance 18 of the hood 1 permits observation of the process.

The device functions as follows:

The boiling vessel 13, the burner 11 and the collecting vessel 7 are enclosed in the hood 1 and separated from the workroom. Gases developing during boiling are discharged through the pipe 3. Vapors condense on the inner walls of the hood, and the condensate formed cannot drip into the boiling vessel 13, but trickles down on the walls of the hood 1, collects on the funnel-like intermediate bottom 5 and passes through the grooves of the pin 9 and the opening 6 into the collecting vessel 7 disposed underneath.

After use, the device can be easily cleaned by means of a hose attached to a water piping.

I claim:—

1. A device for discharging and precipitating troublesome and noxious gases and vapors developing during digestion and boiling in laboratories and workrooms, comprising a hood of acid-proof material, said hood having a centrally apertured funnel-like bottom wall fastened to the side walls of said hood in such manner as to form a complete enclosure, a fume discharge pipe connected with said hood, a box-like stand so fastened beneath said hood as to support said hood, a collecting vessel slidably arranged in said stand beneath said central aperture in such position as to collect condensate forming on the inner walls of said hood and discharging through said central aperture, said stand and collecting vessel being so arranged as to together form a complete enclosure beneath said central aperture, and a support adapted to carry such materials and apparatus as are commonly used in laboratory hoods, said support resting on the bottom wall of said hood and having a member removably inserted in and snugly fitting said central aperture, said support and member being grooved in such manner as to provide at least one complete passageway for condensate flowing along said bottom wall and discharging through said central aperture.

2. A device for discharging and precipitating troublesome and noxious gases and vapors developing during digestion and boiling in laboratories and workrooms, comprising a hood of acid-proof material, said hood having a centrally apertured funnel-like bottom wall fastened to the side walls of said hood in such manner as to form a complete enclosure, a fume discharging pipe connected with said hood, a box-like stand so fastened beneath said hood as to support said hood, a collecting vessel slidably arranged in said stand beneath said central aperture in such position as to collect condensate forming on the inner walls of said hood and discharging through said central aperture, said stand and collecting vessel being arranged as to together form a complete enclosure beneath said central aperture, and a support resting on the bottom wall of said hood, said support consisting of a pin member removably inserted in and snugly fitting said central aperture and a plate supported by said pin member, said plate carrying a burner and a tripod supporting a boiling vessel, said plate and pin member being grooved in such manner as to provide at least one complete passageway for condensate flowing along said bottom wall and discharging through said central aperture, and an opening in the front wall of said hood to facilitate access thereto, and a glass door for closing said opening and permitting observation of the inside.

3. A device according to claim 1, wherein the hood consists of suitable ceramic material.

GOTTFRIED DEIBEL.